(12) United States Patent
Mayer

(10) Patent No.: US 11,537,294 B2
(45) Date of Patent: Dec. 27, 2022

(54) POSITION-MEASURING DEVICE AND METHOD FOR OPERATING THE SAME

(71) Applicant: DR. JOHANNES HEIDENHAIN GmbH, Traunreut (DE)

(72) Inventor: Elmar Mayer, Nussdorf (DE)

(73) Assignee: DR. JOHANNES HEIDENHAIN GMBH, Traunreut (DE)

( * ) Notice: Subject to any disclaimer, the term of this patent is extended or adjusted under 35 U.S.C. 154(b) by 0 days.

(21) Appl. No.: 17/158,037

(22) Filed: Jan. 26, 2021

(65) Prior Publication Data

US 2021/0240361 A1 Aug. 5, 2021

(30) Foreign Application Priority Data

Feb. 3, 2020 (DE) ..................... 10 2020 201 282.2

(51) Int. Cl.
*G06F 3/06* (2006.01)
*G06F 11/14* (2006.01)
*G06F 1/3225* (2019.01)

(52) U.S. Cl.
CPC .......... *G06F 3/0619* (2013.01); *G06F 1/3225* (2013.01); *G06F 3/068* (2013.01); *G06F 3/0658* (2013.01); *G06F 11/1448* (2013.01)

(58) Field of Classification Search
None
See application file for complete search history.

(56) References Cited

U.S. PATENT DOCUMENTS

| | | | |
|---|---|---|---|
| 2010/0011261 A1* | 1/2010 | Cagno | G06F 11/1064 714/719 |
| 2010/0019135 A1 | 1/2010 | Eckert et al. | |
| 2010/0245839 A1* | 9/2010 | Oberhauser | G01D 5/34715 356/498 |
| 2011/0231689 A1* | 9/2011 | Atkins | H02J 3/14 713/340 |
| 2018/0159405 A1* | 6/2018 | Strasser | G05B 19/19 |
| 2020/0310971 A1* | 10/2020 | Cosby | G06F 1/305 |
| 2021/0270640 A1* | 9/2021 | Yasutomi | G01D 5/34792 |

FOREIGN PATENT DOCUMENTS

DE 102006041056 A1 3/2008

* cited by examiner

*Primary Examiner* — Kaushikkumar M Patel
(74) *Attorney, Agent, or Firm* — Leydig, Voit & Mayer, Ltd.

(57) ABSTRACT

A position-measuring device includes a graduation carrier having a measuring graduation, position measurement electronics, a data memory and a power supply. The data memory includes a first memory which is a volatile memory for storing additional data, a second memory which is a writable non-volatile memory, and a memory controller for controlling transfer and storage of additional data from the first into the second memory. The power supply includes an input stage, a first output stage for the position measurement electronics, a second output stage for the data memory, and a voltage monitor which will turn off the first output stage of the power supply in response to a drop below a minimum value and signal the drop to the memory controller by a backup signal. In response to the backup signal, the memory controller will transfer additional data from the first memory into the second memory.

15 Claims, 2 Drawing Sheets

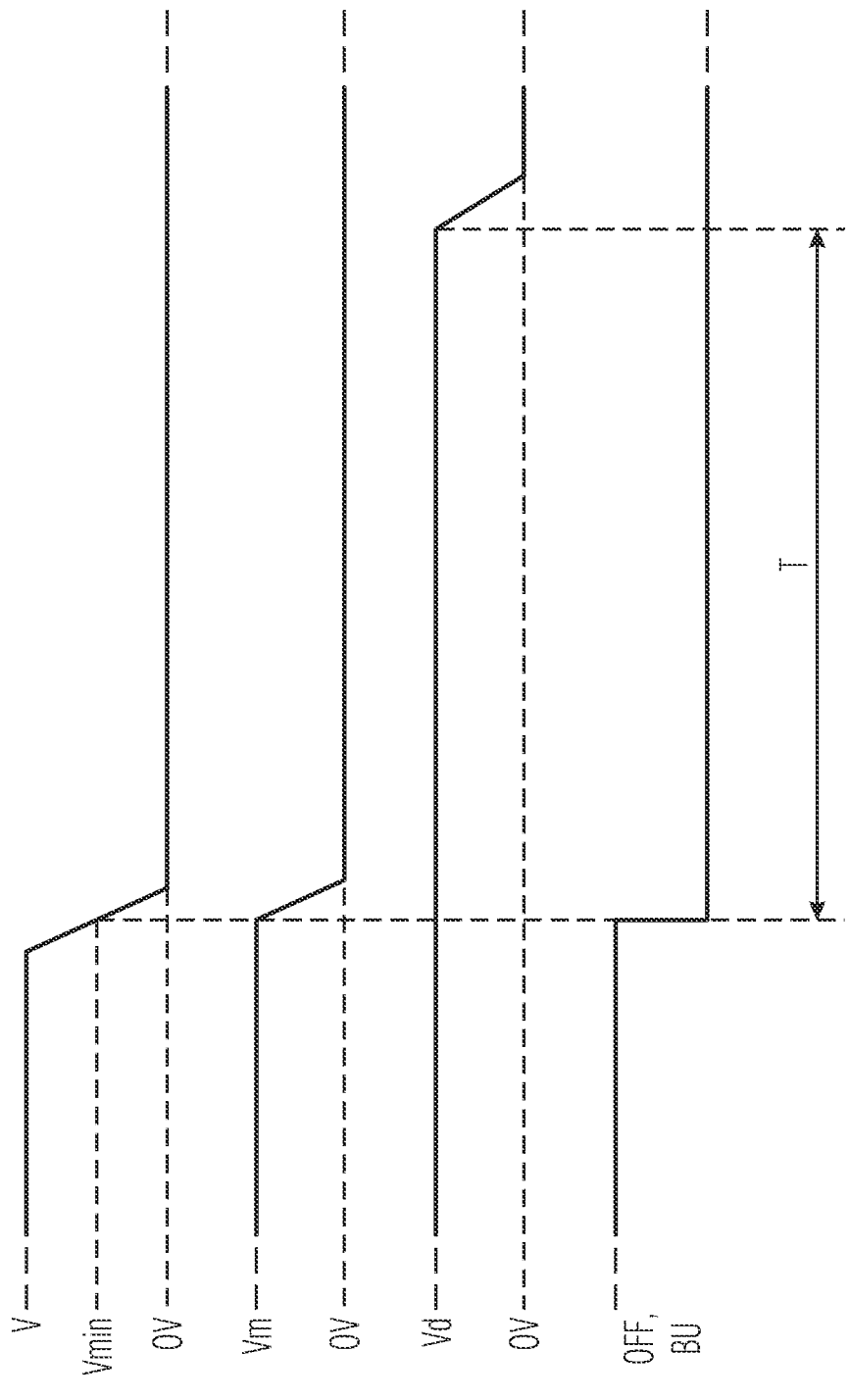

POSITION-MEASURING DEVICE AND METHOD FOR OPERATING THE SAME

CROSS-REFERENCE TO PRIOR APPLICATION

Priority is claimed to German Patent Application No. DE 10 2020 201 282.2, filed on Feb. 3, 2020, the entire disclosure of which is hereby incorporated by reference herein.

FIELD

The present invention relates to a position-measuring device and a method for operating the same.

BACKGROUND

In automation technology, it is common to use measuring devices which provide digital measurement values. In the field of numerical control systems, which are used, for example, to control machine tools, this applies particularly to position-measuring devices for measuring linear or rotary movements. Position-measuring devices which generate digital (absolute) measurement values are referred to as absolute position-measuring devices.

The transmission of absolute position values and other data is primarily accomplished using serial data interfaces because they make do with only a few data-transmission lines.

Often, the functionality of position-measuring devices includes not only position measurement alone, but also the acquisition of additional data. Additional data may be measurement values from sensors located within the position-measuring device or in the proximity of the location of use of the position-measuring device. In the latter case, suitable sensor interfaces are provided for the connection of the sensor to the position-measuring device. DE 10 2006 041 056 A1 describes such a position-measuring device. Another group of additional data is data resulting from the processing of measurement signals for determining position values. Examples of such data include error and diagnostic data. The acquired data may, possibly after processing, either be directly output to subsequent electronics via the device interface or stored in the position-measuring device and transmitted at a later time. The latter variant is often preferred because of the limited bandwidth of the sensor interfaces.

If the additional data is stored in a volatile memory (RAM), then the problem arises that the stored data is lost when the supply voltage is cut off or fails for other reasons. If non-volatile memory (e.g., EEPROM, flash memory) is used for data storage, the number of write or memory cycles is currently too low for the required service life of the position-measuring device.

To ensure that data is retained even when the supply voltage fails, circuits are known where additional data is stored in a volatile memory during operation, and a non-volatile memory is provided into which the stored additional data can be transferred as soon as a power failure is detected. Such a circuit has the disadvantage that a high-capacity energy storage device must be provided to maintain the power supply to the position-measuring device during the transfer of the additional data from the volatile memory into the non-volatile memory. Energy storage devices suitable for this purpose include electrolytic capacitors or so-called supercapacitors (e.g., Goldcaps), which, however, require considerable space.

SUMMARY

In an embodiment, the present invention provides a position-measuring device including a graduation carrier having at least one measuring graduation, position measurement electronics, a data memory and a power supply. The position measurement electronics include at least one scanner configured to generate position signals by scanning the at least one measuring graduation, a processor configured to process the position signals into position values, and an interface. The data memory includes a first memory which is a volatile memory configured to store additional data from an additional data source, a second memory which is a writable non-volatile memory configured to receive and store additional data from the first memory, and a memory controller configured to control transfer and storage of the additional data from the first memory into the second memory. The power supply includes an input stage having at least one energy storage configured to store energy from a main supply voltage, a first output stage configured to produce a first supply voltage that powers the position measurement electronics using the energy stored in the energy storage, a second output stage configured to produce a second supply voltage that powers the data memory using the energy stored in the energy storage, and a voltage monitor configured to monitor the main supply voltage for a drop below a minimum value. The voltage monitor is configured to turn off the first output stage of the power supply in response to a drop below the minimum value and to signal the drop below the minimum value to the memory controller by a backup signal. The memory controller is configured to transfer additional data from the first memory into the second memory and store the additional data in the second memory in response to arrival of the backup signal.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following:

FIG. 2 is a signal diagram illustrating the method according to an embodiment of the present invention.

DETAILED DESCRIPTION

Figure 1:
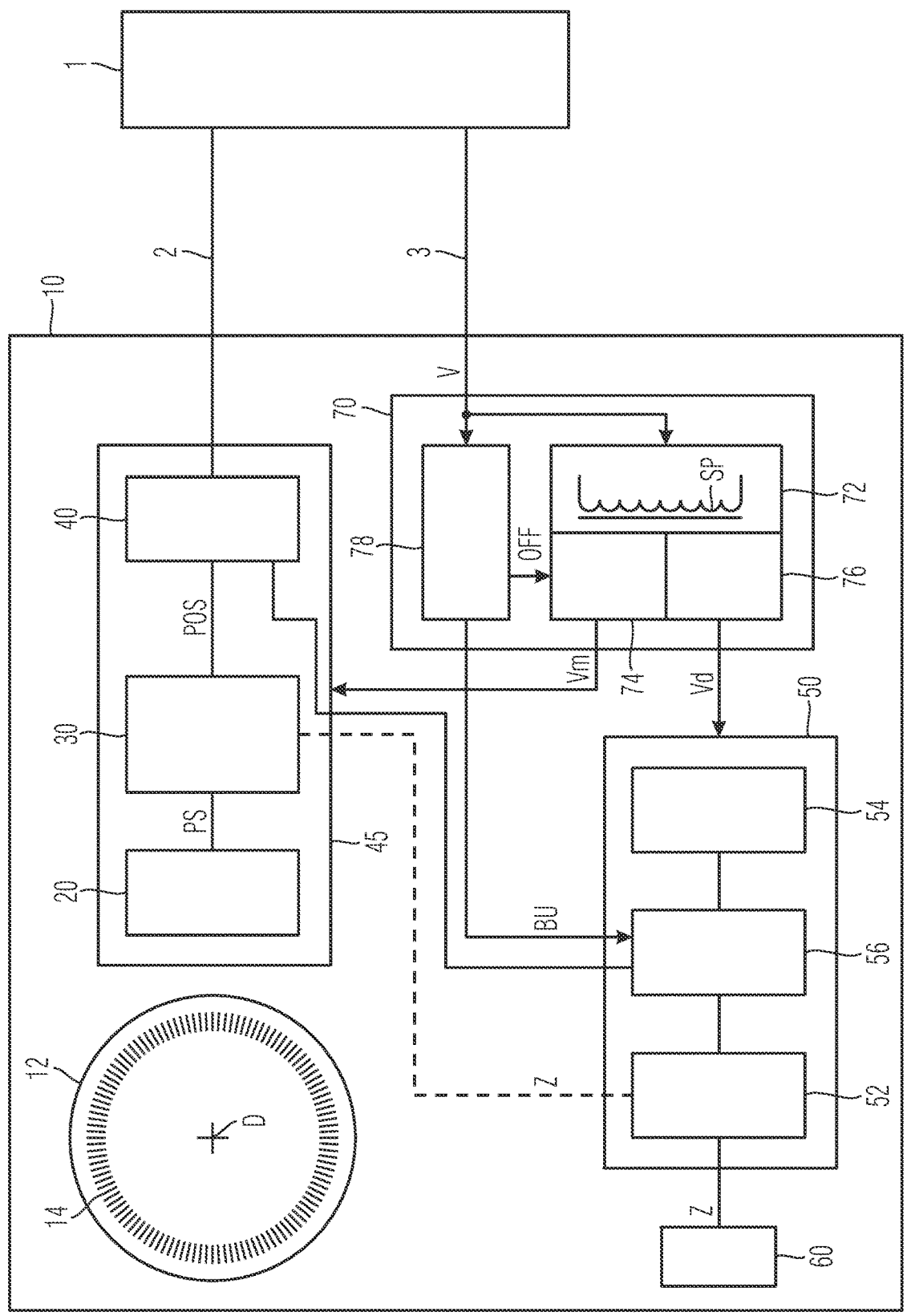
FIG. 1 is a block diagram showing a position-measuring device according to an embodiment of the present invention in conjunction with subsequent electronics.

In an embodiment, the present invention improves the storage of additional data in a position-measuring device.

Accordingly, in an embodiment, the present invention provides a position-measuring device including a graduation carrier having at least one measuring graduation, position measurement electronics, a data memory, and a power supply, wherein:

the position measurement electronics include at least one scanning device for producing position signals by scanning the measuring graduation, a processing unit for processing the position signals into position values, and an interface unit, the data memory includes a first memory which is a volatile memory in which additional data from an additional data source can be stored, a second memory which is a writable non-volatile memory into which additional data from the first memory can be transferred and stored, and a memory controller capable of controlling the transfer and storage of the additional data from the first memory into the second memory, and the power supply includes an input stage having at least one energy storage device for storing energy from a main supply voltage, a first output stage which produces a first supply voltage for powering the position measurement electronics using the energy stored in the energy storage device, a second output stage which produces a second supply voltage for powering the data memory using the energy stored in the energy storage device, and a voltage monitor which monitors the main supply voltage for a drop below a minimum value, wherein:

the voltage monitor is configured to turn off the first output stage of the power supply in response to a drop below the minimum value and to signal the drop below the minimum value to the memory controller by a backup signal, and the memory controller is configured to transfer additional data from the first memory into the second memory and store it therein in response to the arrival of the backup signal.

In another embodiment, the present invention provides an improved method for storing additional data in a position-measuring device.

Accordingly, in an embodiment, the present invention provides a method for operating a position-measuring device including a graduation carrier having at least one measuring graduation, position measurement electronics, a data memory, and a power supply, wherein:

the position measurement electronics include at least one scanning device for generating position signals by scanning the measuring graduation, a processing unit for processing the position signals into position values, and an interface unit, the data memory includes a first memory which is a volatile memory in which additional data from an additional data source are stored, a second memory which is a writable non-volatile memory into which additional data from the first memory can be transferred and stored, and a memory controller which controls the transfer and storage of the additional data from the first memory into the second memory, and the power supply includes an input stage having at least one energy storage device for storing energy from a main supply voltage, a first output stage which produces a first supply voltage for powering the position measurement electronics using the energy stored in the energy storage device, a second output stage which produces a second supply voltage for powering the data memory using the energy stored in the energy storage device, and a voltage monitor which monitors the main supply voltage for a drop below a minimum value, wherein:

the voltage monitor turns off the first output stage of the power supply in response to a drop below the minimum value and signals the drop below the minimum value to the memory controller by a backup signal, and the memory controller transfers additional data from the first memory into the second memory and stores it therein in response to the arrival of the backup signal.

Further advantages and embodiments will be apparent from the detailed description of the exemplary embodiments.

FIG. 1 shows a block diagram depicting an inventive position-measuring device 10 in conjunction with subsequent electronics 1. In order to perform its basic function of providing and outputting position values, position-measuring device 10 includes a graduation carrier 12 having at least one measuring graduation 14, at least one scanning device 20, a processing unit 30, and an interface unit 40.

The position-measuring device 10 can be, e.g., a length-measuring device, as shown in FIG. 1, or an angle-measuring device (rotary encoder). Accordingly, graduation carrier 12 may be a straight scale having a measuring graduation 14 arranged in the direction of the scale, or a circular disk having a measuring graduation 14 arranged radially about a center of rotation of the disk. Measuring graduation 14 has at least one graduation track, which allows positions (angles) to be determined by scanning of the graduation track with scanning device 20. To this end, measuring graduation 14 and scanning device 20 are arranged to be movable relative to one another along a measurement direction.

To permit operation of position-measuring device 10, graduation carrier 12 is rotatably mounted about a center of rotation D and non-rotatably connected to a shaft whose angular position, and possibly the number of revolutions performed, is/are to be measured using position-measuring device 10.

Scanning device 20 is disposed stationary with respect to graduation carrier 12 and suitably configured to scan measuring graduation 14 on graduation carrier 12 and generate position-dependent (angle-dependent) position signals PS as a function of the rotation angle of graduation carrier 12. Position signals PS may include analog or digitally coded signals.

If multiple measuring graduations 14 are provided, then these may be scanned by multiple scanning devices 20. Equally, it is possible that one measuring graduation 14 may be scanned by multiple scanning devices 20, for example, at different angular positions along the circumference of graduation carrier 12.

The present invention is not limited to any physical scanning principle. Thus, it is possible to use inductive, photoelectric, magnetic or capacitive scanning principles generally known in the art.

Position signals PS are fed to processing unit 30, which processes them into a position value POS and outputs them to interface unit 40. The processing will not be discussed in greater detail here. Processing may include steps such as signal correction, demodulation, digitization, etc.

In addition to position values POS, further movement values, such as the number of revolutions performed, rotational speed N (angular velocity), acceleration or jerk may also be derived from position signals PS in processing unit 30 and fed to interface unit 40. Diagnostic values, such as parameters of position signals PS (maximum or minimum values, offset, phase difference . . . ), may also be determined in processing unit 30.

Interface unit 40 is used for communication via a data channel 2 with subsequent electronics 1, which do not form part of position-measuring device 10. Interface unit 40 may be configured as a serial interface; i.e., data is transmitted via data channel 2 in the form of serial data streams or data packets. Advantageously, interface unit 40 is configured to be bidirectional.

Subsequent electronics 1 are a device used in automation technology, such as a numerical machine tool controller, a manufacturing robot controller, a position indicator, or any other equipment controller.

Furthermore, position-measuring device 10 includes a data memory 50 for capturing and storing additional data Z which is supplied to data memory 50 from an additional data source. Data memory 50 includes a first memory 52, a second memory 54, and a memory controller 56. First memory 52 is a volatile memory, which loses the stored data when its power supply fails. In contrast, second memory 54 is a writable non-volatile memory (e.g., EEPROM, flash memory), in which the stored data is retained even in the event of a power supply failure.

First memory 52 may be configured as a circular buffer; i.e., each time all memory locations are filled, the oldest stored value is overwritten by a new value received from the additional data source.

In this example, a sensor 60 is an additional data source and is mounted within a housing of position-measuring device 10. This sensor may be a temperature sensor, an acceleration sensor, a vibration sensor, etc. Alternatively, sensor 60 may also be disposed outside of position-measuring device 10 and connected thereto via a sensor interface.

Alternatively or additionally, processing unit 30 may also be an additional data source, as illustrated by the dashed line. In this case, additional data Z may be data resulting from the processing or analysis of positional signals PS, for example, signals errors, such as offset, phase, or amplitude errors, as well as error/correction values. Position values POS, or further movement values derived from their variation with time, such as the number of revolutions performed, rotational speed N (angular velocity), acceleration or jerk, may also be additional data Z.

The storage of additional data Z is performed in an event-driven manner and is initiated by memory controller 56. Examples of events that may trigger storage of a measurement value include:

expiration of a defined time interval (cyclic measurement)
occurrence of an error
arrival of a store command from subsequent electronics 1 via interface unit 40
reaching of a defined position (position-controlled triggering of the measurement).

Each new measurement value of additional data Z is stored in first memory 52.

First memory 52 and second memory 54 are connected to memory controller 56, so that additional data Z stored in first (volatile) memory 52 can be transferred into second (non-volatile) memory 54 and permanently stored therein. Transmission and storage are performed under the control of memory controller 56. There may also be provided an option to transfer data from second memory 54 into first memory 52.

Position-measuring device 10 further includes a power supply 70, to which a main supply voltage V is supplied from subsequent electronics 1 via supply lines 3. Power supply 70 generates from main supply voltage V at least two supply voltages for powering components/functional blocks of position-measuring device 10, the supply voltages including at least a first supply voltage Vm for powering position measurement electronics 45 and at least a second supply voltage Vd for powering data memory 50.

Position measurement electronics 45 include circuitry parts and components required to perform the basic function of position-measuring device 10, namely providing position values POS and, where applicable, outputting the same to subsequent electronics 1. In the present example, position measurement electronics 45 include scanning device 20, processing unit 30, and interface unit 40. Position measurement electronics 45 may be completely or partially configured in the form of a highly integrated device (ASIC, FPGA, etc.).

Advantageously, position-measuring device 10 has provided therein a highly integrated device that includes both functional blocks of position measurement electronics 45, which are powered by a first supply voltage Vm, and functional blocks of data memory 50, which are powered by second supply voltage Vd.

Power supply 70 includes an input stage 72, to which is supplied main supply voltage V, a first output stage 74 for producing first supply voltage Vm, as well as a second output stage 76 for producing second supply voltage Vd. The power supply further includes a voltage monitor 78.

The operating principle on which power supply 70 is based is that of a DC-to-DC converter, with input stage 72 including at least one energy storage device SP in the form of an inductance (coil or transformer) or/and a capacitance (capacitor) and capable of storing the required amount of energy needed by the two output stages 74, 76 to provide the respective supply voltages Vm, Vd. A periodically operating electronic switch is used in conjunction with energy storage device SP to produce an alternating current, from which output stages 74, 76 generate the supply voltages Vm, Vd, inter alia by rectification and smoothing. Thus, the two output stages 74, 76 produce the supply voltages using the energy stored in common energy storage device SP.

Voltage monitor 78 monitors main supply voltage V. If main supply voltage V drops below a minimum value Vmin, for example, in the event of a cut-off or a power failure, then voltage monitor 78 deactivates first output stage 74 of power supply 70 via a cutoff signal OFF, thereby cutting off first supply voltage Vm, and signals this power failure event to memory controller 56 via a backup signal BU. Due to the cutting-off of first supply voltage Vm, the entire energy stored in energy storage device SP of input stage 72 is now available to maintain second supply voltage Vd.

If memory controller 56 receives backup signal BU as a result of a power failure event, then it initiates a data backup operation to cause additional data Z stored in first memory 52 to be transferred and stored into second memory 54. Advantageously, the data backup operation performs a complete transfer and storage of additional data Z.

In an advantageous embodiment, when main supply voltage V is switched on again, the additional data Z saved in second memory 54 are transferred into first memory 52, so that the initial state prior to the power failure event is restored.

In an alternate embodiment, the data backup operation may be designed such that additional data Z is only selectively transferred into second memory 54. Possibly, data resulting from processing of additional data Z, such as minimum, maximum and mean values, may be stored. What is essential to the present invention is that the data backup operation be performed in response to a failure of main supply voltage V, and consequently upon cut-off of first supply voltage Vm.

FIG. 2 shows a signal diagram illustrating the method according to the invention. The diagram exemplarily shows the variation with time of main supply voltage V, first supply voltage Vm, second supply voltage Vd, and of cutoff signal OFF and backup signal BU. The latter have the same time profile and, therefore, are represented as a single signal. The signals shown have already been described in connection with FIG. 1 and carry the same reference numerals.

When main supply voltage V drops below the defined minimum value Vmin, then voltage monitor 78, on the one hand, outputs cutoff signal OFF to first output stage 74 of power supply 70, thereby cutting it off. On the other hand, voltage monitor 78 outputs backup signal BU to memory controller 56, thereby signaling it to cause the additional data Z stored in first memory 52 to be transferred and stored into second memory 54. For this purpose, a data storage interval T is available, which begins with the arrival of backup signal BU at memory controller 56 and ends with a failure of second supply voltage Vd. This failure may result from the discharge of energy storage device SP, because second output stage 76 is then no longer able to maintain second supply voltage Vd. However, it may also be provided that a controlled shutdown be performed by voltage monitor 78. The latter variant ensures a controlled shutdown of the circuit parts that are powered by second supply voltage Vd, in particular data memory 50.

Due to the cutting-off of first supply voltage Vm in accordance with the invention, data storage interval T; i.e, the period of time during which second supply voltage Vd can be maintained after a failure of main supply voltage V, is much longer than without this measure.

It should be noted that the illustrated signal levels and signal polarities are to be understood as being merely exemplary.

The present invention is of course not limited to the exemplary embodiments described herein, but rather may be modified within the scope of the claims by those skilled in the art.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A position-measuring device comprising:
a graduation carrier having at least one measuring graduation;
position measurement electronics including at least one scanner configured to generate position signals by scanning the at least one measuring graduation, a processor configured to process the position signals into position values, and an interface;
a data memory including a first memory which is a volatile memory configured to store additional data from an additional data source, a second memory which is a writable non-volatile memory configured to receive and store additional data from the first memory, and a memory controller configured to control transfer and storage of the additional data from the first memory into the second memory; and
a power supply including an input stage having at least one energy storage configured to store energy from a main supply voltage, a first output stage configured to produce a first supply voltage that powers the position measurement electronics using the energy stored in the energy storage, a second output stage configured to produce a second supply voltage that powers the data memory using the energy stored in the energy storage, and a voltage monitor configured to monitor the main supply voltage for a drop below a minimum value,
wherein the voltage monitor is configured to turn off the first output stage of the power supply in response to a drop below the minimum value and to signal the drop below the minimum value to the memory controller by a backup signal, and
wherein the memory controller is configured to transfer at least a part of the additional data from the first memory into the second memory and store the additional data in the second memory in response to arrival of the backup signal, wherein the memory controller is configured to process the additional data prior to the storage in the second memory.

2. The position-measuring device as recited in claim 1, wherein the energy storage is a coil and/or a capacitor.

3. The position-measuring device as recited in claim 1, wherein the additional data source is a sensor.

4. The position-measuring device as recited in claim 1, wherein the additional data source is the processor.

5. The position-measuring device as recited in claim 1, wherein the storage of the additional data in the first memory is performed in response to at least one of the following events:
expiration of a time interval;
arrival of a store command at the interface;
reaching of a defined position; and
occurrence of an error.

6. The position-measuring device as recited in claim 1, wherein the processing of the additional data includes determining minimum, maximum and/or mean values.

7. The position-measuring device as recited in claim 6, wherein the memory controller transfers and stores the minimum, maximum and/or mean values in the second memory.

8. The position-measuring device as recited in claim 1, wherein the memory controller selectively transfers only a part of the additional data stored in the first memory.

9. The position-measuring device as recited in claim 1, wherein the memory controller is configured to trigger a data backup procedure upon arrival of the backup signal, and wherein the data backup procedure includes the processing of the additional data prior to storing in the second memory.

10. A method for operating a position-measuring device including a graduation carrier having at least one measuring graduation, position measurement electronics, a data memory, and a power supply, wherein the position measurement electronics include at least one scanner for generating position signals by scanning the measuring graduation, a processor for processing the position signals into position values, and an interface, wherein the data memory includes a first memory which is a volatile memory in which additional data from an additional data source are stored, a second memory which is a writable non-volatile memory into which additional data from the first memory can be transferred and stored, and a memory controller which controls transfer and storage of the additional data from the first memory into the second memory, and wherein the power supply includes an input stage having at least one energy storage in which energy from a main supply voltage is stored, a first output stage which produces a first supply voltage for powering the position measurement electronics using the energy stored in the energy storage, a second output stage which produces a second supply voltage for powering the data memory using the energy stored in the energy storage, and a voltage monitor which monitors the main supply voltage for a drop below a minimum value, the method comprising:

turning off, by the voltage monitor, the first output stage of the power supply in response to a drop below the minimum value, and signaling the drop below the minimum value to the memory controller by a backup signal; and transferring, by the memory controller, at least a part of the additional data from the first memory into the second memory and storing the additional data in the second memory in response to arrival of the backup signal, wherein the memory controller processes the additional data prior to the storage in the second memory.

11. The method as recited in claim 10, further comprising storing of the additional data in the first memory, prior to the transferring into the second memory, in response to at least one of the following events:

expiration of a time interval;

arrival of a store command at the interface;

reaching of a defined position; and occurrence of an error.

12. The method as recited in claim 10, wherein the processing of the additional data includes determining minimum, maximum and/or mean values.

13. The method as recited in claim 12, wherein memory controller transfers and stores the minimum, maximum and/or mean values in the second memory.

14. The method as recited in claim 10, wherein the memory controller selectively transfers only a part of the additional data stored in the first memory.

15. The method as recited in claim 10, wherein the arrival of the backup signal triggers the memory controller to initiate a data backup procedure, and wherein the data backup procedure includes the processing of the additional data prior to storing in the second memory.

\* \* \* \* \*